United States Patent Office 2,801,618
Patented Aug. 6, 1957

2,801,618

AIRCRAFT CONTROL SYSTEM

Mark I. Place, Pittsburgh, Pa., and Arne P. Rasmussen, Millersville, Md., assignors to Westinghouse Electric Corporation, East Pittsburgh, Pa., a corporation of Pennsylvania Application August 29, 1955, Serial No. 530,934

4 Claims. (Cl. 121—41)

This invention relates to aircraft control systems and more particularly to systems for selectively controlling the position of a control surface of an aircraft by means of signals imparted by either a human pilot or an autopilot, wherein the human pilot may override the controlling effect of the autopilot.

Systems for hydraulically controlling a control surface of an aircraft by either an autopilot or a human pilot are well known in the art; a system that has proved very satisfactory is the hydraulic servo system described in the copending application of A. P. Rasmussen for "Fail Safe Power Boost System," Serial No. 375,546, filed August 20, 1953, now Patent No. 2,773,660. In this system a valve is provided which directs the flow of pressurized fluid to one side or the other of a piston, the piston cylinder of which is linked to the aircraft control surface. The movable stem of the valve is connected at one end to a manual control stick and at the other end to an auxiliary hydraulically actuated piston under the control of an autopilot. A decoupling linkage is provided between the control stick and the stem of the main control piston, the function of which is to relieve the autopilot of the necessity of driving the control stick when it (the autopilot) is controlling the movement of the control surface. The human pilot may assume control over the system when necessary, actuating auxiliary control equipment, in this case an auxiliary hydraulic piston. While the system has been quite satisfactory for the purpose for which it was originally intended, it has been found possible in certain applications thereof to obtain positive feedback of energy into the autopilot through the control system when the limits of the decoupling linkage are exceeded. This results in violent overcontrol of the aircraft that can conceivably result in disruptive forces being exerted on the aircraft air frame, and in any event, can bring about loss of control of the aircraft by the autopilot insofar as its primary function of directing the craft in a given direction is concerned.

Accordingly, it is one object of this invention to provide an improved aircraft control system wherein provision is made for controlling the system from an autopilot and from a manual flight controller.

Another object is to provide a hydraulic aircraft control servo system wherein manual control over the aircraft may be exerted whether or not the hydraulic system is in operation.

Yet another object is to provide a hydraulic aircraft control servo system wherein the autopilot is at all times ineffective to vary the position of the stick controller, but the stick controller may at all times override the controlling effect of the autopilot.

Other objects and features of our invention will become apparent upon consideration of the following description thereof, when taken in connection with the accompanying drawings, wherein:

Fig. 3 is a cross-sectional side view of a modification of the decoupling aspect of Fig. 2 which serves to illustrate another embodiment of our invention.

In accordance with one aspect of our invention, there is provided a control valve of the type described in the aforementioned A. P. Rasmussen application wherein hydraulic fluid is directed to one side of a hydraulic piston and exhausted from the other to reposition an aircraft control surface. The movable stem of the valve is connected to a piston adapted to reciprocate within a piston cylinder in accordance with the fluid pressure exerted against one face or the other of the piston, which pressure is controlled by an auxiliary valve in accordance with signals received from an autopilot. The piston chamber is connected to the valve stem through a mechanical linkage when the autopilot is deenergized. When the autopilot is energized the control stick is coupled to the valve stem by virtue of the action of the servo mechanism, but the autopilot may move the piston without affecting the control stick.

The second piston chamber is detachably connected to the piston rod by means of a cam which in one position rigidly connects the second piston chamber body to the rod. The cam is driven to a second position whereat the rod is disengaged; this function is performed by means of a hydraulic piston connected to the same source of hydraulic pressure servicing the control piston chamber and the second piston chamber. In the event of failure of the hydraulic pressure supply, the control stick is mechanically connected to the valve stem.

Figure 1:
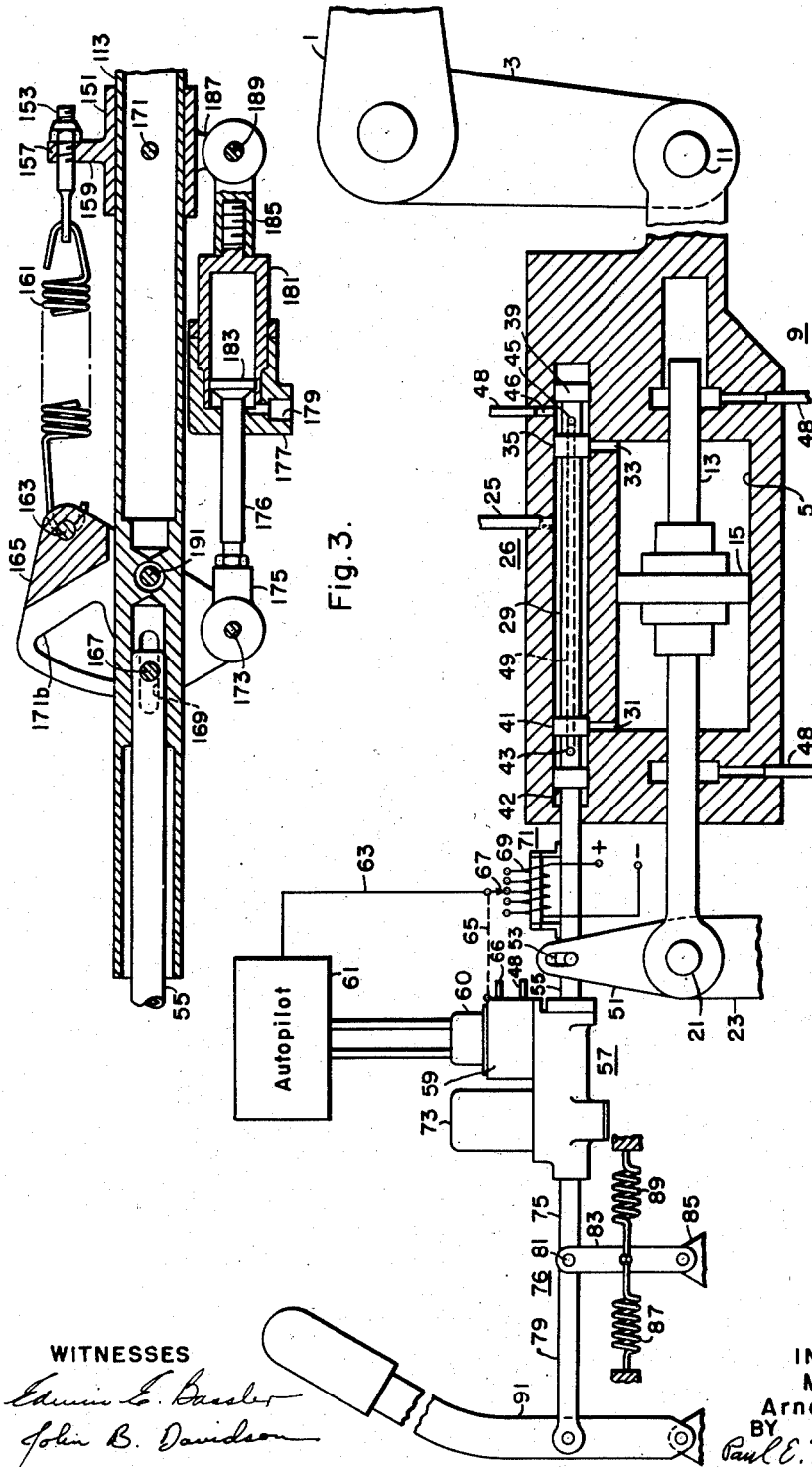
Figure 1 is a simplified side view partially in cross-section of one embodiment of our invention.
Figure 2:
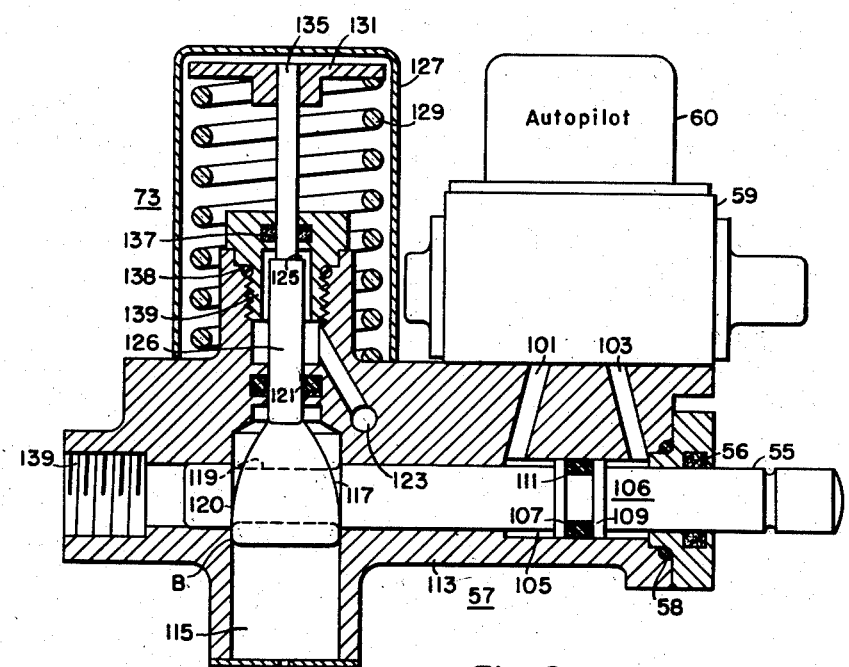
Fig. 2 is an enlarged view, partially in cross-section, of one of the elements of the system illustrated in Fig. 1.

With reference now to the embodiment of our invention illustrated in Figs. 1 and 2 taken together, there is shown an elevator control surface 1 which is connected to a control horn 3 driven by a hydraulic actuator generally designated 9 comprising a cylinder 5 and a piston 15. The piston 15 is mounted on a rod 13 which strokes within bearings in the end of cylinder 5 and which extends through the left end of the cylinder, as viewed. The rod is pivotally anchored at 21 to a stationary pivot support 23 which is secured to some portion of the air frame.

The actuator is controlled by a main control valve 26 which is mounted on the top side of the cylinder 5 and provided with a slide valve element or stem 29 having a pair of valves 41 and 35 which control the flow of hydraulic fluid through respective ports 31 and 33 in the ends of cylinder 5. Hydraulic fluid under pressure is admitted to the boost valve through a supply conductor 25 which enters the boost valve housing at a point intermediate valves 41 and 35. A bore 49 extends axially through stem 29 from a hole 43 to the left of valve 41 to an exit hole 45 to the right of valve 35. An exhaust port 46 is provided which extends through the boost valve housing to the right of valve 35.

It will be appreciated, therefore, that displacement of the slide valve element 29 to the right will seal the valve port 31 from the supply of hydraulic fluid and open valve port 33 to the supply. High pressure hydraulic fluid is thereby applied to the right side of piston 15 of the actuator. Since piston 15 is secured against movement, cylinder 5 will be displaced to the right, which will deflect the elevator 1 upwardly. Diminishing volume on the left side of piston 5 will force hydraulic fluid through the port 31, into bore 49 and out exhaust port 46 into the return line 48 of the hydraulic system.

The complete hydraulic system has not been shown in order to simplify the illustration. The supply conductor to the various points of the control system have been numbered 25, 66 and 123, and each return line has been numbered 48. The supply conductors may be fed from a common supply source such as the fluid pressure pump, and the return lines may be connected to a suitable sump or other hydraulic fluid reservoir from which the hydraulic fluid is drawn by the pump.

The valve stem 29 is mechanically linked to piston rod 55 of an auxiliary control piston 106 having piston sections 107 and 109 (see Fig. 2) between which is inserted an O-ring of neoprene or similar rubber-like sealing material. The piston 106 is contained within a housing 57 which also includes decoupling mechanism 73, pilot valve 59, and autopilot 60. The valve stem 29 and piston rod 55 are supported at their common end by a support member 51 which is hinged at stationary pivot support 23. The auxiliary piston 106 reciprocates within a piston chamber 105 having hydraulic ports 101 and 103 opening into the ends thereof. Flow of fluid into and out of ports 101 and 103 is controlled by pilot valve assembly 59 responsive to output signals from autopilot 60 such that fluid pressure from conduit 66 (which may be, but is not necessarily, derived from the same source that supplies conduit 25) is gated to one of the piston faces through one of the ports, for example, port 103, and the other port is connected to return line 48. A suitable assembly for performing this function may be found in the aforementioned application Serial No. 375,546 of A. P. Rasmussen.

The end of assembly 57 opposite piston rod 55 is internally screw threaded so as to receive rod 75 of mechanical linkage 76, rod 79 of which linkage is connected to control stick 91. The mechanical linkage 76 as shown comprises connecting rods 75 and 79 pivotally mounted on pivot member 85 through pivoted member 83. Centering springs 87 and 89 are connected to the center of pivoted member 83 so as to maintain the mechanical linkage in a central position with no force on the control stick 91.

Piston rod 55 (see Fig. 2) is extended past piston 106 and has a slot 119 near the extremity thereof. A generally wedge-shaped, spring-biased cam 117 is fitted into this slot so as to completely fill the slot and rigidly connect piston rod 55 to casing 113 when compression spring 129 biases the cam to the position shown. A short section 120 at the wide end of the cam has perpendicular sides to prevent any possibility of a large value of force exerted by rod 55 springing the cam up. The spring seat 131 is connected to the cam though a pair of connecting sections 126 and 135 which have different cross-sectional areas so as to form a shoulder at the juncture thereof. If convenient, the two sections 135 and 126 may be machined from the same piece of stock. The shoulder 125 acts as a piston so that when pressurized fluid is injected from conduit 123 into the chamber formed by screw threaded member 139 and body member 113, there will be exerted on the shoulder a force opposite to that exerted by spring 129. This will tend to force the cam downward as viewed so that piston rod 55 will be freed for relative movement with respect to casing 113.

Pressurized fluid for conduit 123 may be, but is not necessarily, derived from the same source of fluid pressure that services supply conduit 25. In the event of failure of the prime source of hydraulic pressure, the only force exerted on the cam assembly will be that of spring 129 so that the casing 113 will be mechanically connected to piston rod 55 as has been described.

One feedback system is provided into the autopilot. The system, which senses the difference between the position of piston 107, 109 to the position at which the autopilot is trying to drive the piston, is provided by rheostat 71 which is energized by any convenient source of direct current. The variable tap 67 on the rheostat is mechanically connected to some portion of assembly 57, for example, pilot valve 59. Lead 63 provides the connection for the feedback signal from tap 67 to the autopilot.

Let it be assumed that the source of fluid pressure is supplying pressure to conduits 25 and 123 so that the cam 117 is driven to a position whereat piston rod 55 is freed for relative movement with respect to casing 113. Should the autopilot indicate that a change in elevator position is in order so that conduit 25 is connected to port 101, the piston 106 will be driven to the right. This will connect pressure conduit 25 to fluid port 33 and fluid pressure will be exerted upon the right side of piston 15. Hydraulic actuator 9 will be driven to the right until the feedback signals are such that the system is again in balance, at which time the pressures exerted on the opposite faces of piston 106 will be equal.

Assuming that the autopilot is functioning and controlling the movement of the aircraft when the human pilot desires to control the movement of the aircraft, he need only to move the control stick forwardly or backwardly as he desires. By virtue of the action of the servo mechanism, the piston rod 55 will be forced to follow the movement of casing 113 which, in turn, is mechanically linked to the control stick, as has been described. The pilot thus is able to override the controlling effect of the autopilot at will, and it is not necessary to provide a separate decoupling arrangement that must be actuated or deactuated in order for the human pilot to assume control over the movements of the aircraft. In this operation, by reason of the series servo, the autopilot stability signal is superimposed on the manual control.

It will be appreciated that when the casing 113 and piston rod 55 are locked together by cam 117, as is the case when the source of fluid pressure is inoperative, the pilot still has control over the movements of the aircraft. By virtue of the hydraulic connection between valve stem 29 and cylinder housing 5 provided by collars 39 and 42 on stem 29, a certain amount of lost motion is present, but in effect, a direct connection exists between control stick 91 and elevator 1.

Figure 4:
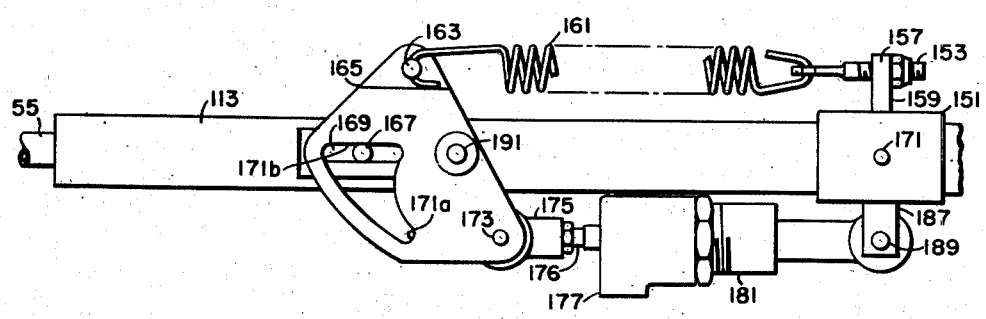
Fig. 4 is a view in elevation of the device shown in Fig. 3.

Fig. 3 and Fig. 4 illustrate a mechanism that may be used to advantage to replace the decoupling cam described above. In this embodiment, piston rod 55 and casing member 113 are connected together by means of a cam 165 which is pivotally mounted at pivot 191 on casing 113. The cam is spring biased to one position by means of a tension spring 161 which is secured at one end to a spring support 151 which is rigidly secured to casing 113. The tension exerted by the spring 161 is adjusted by means of a shoulder 157 which is screw threaded on bolt 153 which has an eye adapted to receive the spring hook. Spring support 151 also pivotally supports cylinder 181 which cooperates with piston 183 to swing the cam 165 to the actuated position shown in Fig. 4. The piston is connected to cam 165 by means of rod 176 which is pivotally hinged by means of member 175 to cam 165 at the end opposite stud 163 to which is secured spring 161. The cam 165 has a cutout section therewithin having a wide edge 171b which progressively narrows to a dimension which will snugly accommodate stud 167 (as indicated at 171a). At the position shown in Fig. 3, stud 167, which is secured to piston rod 55, effectively locks rod 55 to casing 113. When hydraulic pressure is admitted through port 179, piston 183 is driven to the right, as shown, swinging cam 165 to the position shown in Fig. 4, at which position piston rod 55 is free for lateral movement relative to casing 113.

The embodiment shown in Figs. 3 and 4 has certain advantages over that shown in Fig. 2 in that the spring and the fluid-operated actuator are separate and are more readily accessible for ease of maintenance. More importantly, this arrangement affords a longer stroke in decoupled position which permits a longer range of servo operation.

Since numerous changes may be made in the above described construction and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. Hydraulic control means, comprising: a hydraulic actuator having a stationary part and a movable part, a valve mounted in said movable part and having a movable valve stem for controlling the flow of hydraulic fluid to said hydraulic actuator, an auxiliary hydraulic actuator comprising a piston having two faces and a piston housing therefor, said piston being mechanically connected to said movable valve stem, second control means connected with said hydraulic actuator to selectively apply differential hydraulic pressure to said piston faces to move said piston within its housing, first control means mechanically connected to said piston housing adapted to longitudinally move said housing, means connected to said auxiliary hydraulic actuator adapted to rigidly connect said piston and said piston housing together when hydraulic pressure therewithin is less than a given pressure, said means comprising a rod mechanically connected to said valve stem having a longitudinal slot therein, a spring biased cam disposed in an opening in said housing and in an opening in said rod for reciprocating movement, and normally biased to a first position whereat said cam fills said slot to rigidly connect said piston and piston housing, and hydraulically actuated piston means associated with said cam operable to overcome the spring bias of said cam to move said cam to a second position whereat said cam allows longitudinal movement of said rod relative to said piston housing.

2. Flight control apparatus for controlling a control surface of an aircraft from a pressure source of relatively incompressible fluid comprising: a fluid operated actuator having a moving part connected to said control surface, valve means mounted on said moving part of said actuator and having a movable valve element for controlling fluid pressure in said fluid operated actuator, an autopilot, a flight controller, a fluid operated actuator for said movable valve element including a piston rod connected to said movable valve element, a piston integral with said piston rod, and a housing including a piston chamber therein for said piston, valve means controlling movement of said piston relative to said housing responsive to output signals from said autopilot; said flight controller being connected to said housing to vary the position thereof and of said movable valve element by the relatively incompressible fluid within said piston chamber, and means for rigidly connected said piston rod to said housing upon reduction of said fluid pressure below a given pressure.

3. In a hydraulic control system for a control surface of an aircraft, a stationary piston having two faces, a movable member defining a piston chamber, said movable member adapted for reciprocating movement in accordance with the piston face against which fluid pressure is applied, first valve means for admitting fluid pressure to one face or the other of said piston in accordance with movement of a valve stem associated therewith in one direction or the other; means controlling movement of said valve stem responsive to said manual control member and to signals from an autopilot comprising, a second piston having two faces and having a piston rod mechanically linked to said valve stem, second piston cylinder means for said second piston means, second valve means unitary with said second piston cylinder means for gating hydraulic fluid pressure to one face or the other of said second piston in accordance with said signals from said autopilot, means mechanically linking said manual control member to said autopilot, a slot within said piston rod, cam means cooperating with said slot to rigidly connect said piston rod to said second piston cylinder at one position of said cam and to permit relative movement between said second piston cylinder and said second piston at a second position thereof, spring means for biasing said cam to said first position, third piston means adapted to drive said cam to said second position responsive to fluid pressure of greater than a given magnitude, and means for providing fluid pressure to said third piston means from a source of fluid pressure common to said first and second valve means.

4. In a hydraulic control system for a control surface of an aircraft, a stationary piston having two faces, a movable member defining a piston chamber, said movable member adapted for reciprocating movement in accordance with the piston face against which fluid pressure is applied, first valve means for gating fluid pressure to one face or the other of said piston in accordance with movement of a valve stem associated therewith in one direction or the other; means controlling movement of said valve stem responsive to manual control member and to signals from an autopilot comprising, a second piston having two faces and having a piston rod mechanically linked to said valve stem, second piston cylinder means for said second piston means, second valve means unitary with said second piston cylinder means for gating hydraulic fluid pressure to one face or the other of said second piston in accordance with said signals from said autopilot, means mechancially linking said manual control member to said autopilot, a slot within said piston rod, cam means pivoted on said second piston cylinder means having a slot therein of varying cross-section, a stud on said second piston rod adapted to cooperate with said slot to rigidly lock said second piston cylinder to said second piston rod at one position of said cam and to permit relative movement between said second piston rod and said second piston cylinder at a second position of said cam.

References Cited in the file of this patent

UNITED STATES PATENTS

| | | |
|---|---|---|
| 88,431 | Atkins | Mar. 30, 1869 |
| 28,275 | Martin | Oct. 30, 1894 |
| 1,704,759 | Miller | Mar. 12, 1929 |
| 2,395,671 | Kleinhans | Feb. 26, 1946 |
| 2,551,273 | Lisle et al. | May 1, 1951 |
| 2,678,177 | Chenery et al. | May 11, 1954 |
| 2,705,940 | Edwards | Apr. 12, 1955 |